(12) United States Patent
Tanimoto

(10) Patent No.: US 9,385,990 B2
(45) Date of Patent: *Jul. 5, 2016

(54) RELAY SERVER AND RELAY COMMUNICATION SYSTEM

(71) Applicant: MURATA MACHINERY, LTD., Kyoto-shi, Kyoto (JP)

(72) Inventor: Yoshifumi Tanimoto, Kyoto (JP)

(73) Assignee: MURATA MACHINERY, LTD., Kyoto (JP)

(*) Notice: Subject to any disclaimer, the term of this patent is extended or adjusted under 35 U.S.C. 154(b) by 33 days.

This patent is subject to a terminal disclaimer.

(21) Appl. No.: 14/361,385

(22) PCT Filed: Nov. 16, 2012

(86) PCT No.: PCT/JP2012/007382
§ 371 (c)(1),
(2) Date: May 29, 2014

(87) PCT Pub. No.: WO2013/080475
PCT Pub. Date: Jun. 6, 2013

(65) Prior Publication Data
US 2014/0334497 A1    Nov. 13, 2014

(30) Foreign Application Priority Data

Nov. 30, 2011    (JP) ................................. 2011-263028

(51) Int. Cl.
*H04L 12/28*    (2006.01)
*H04L 29/12*    (2006.01)
(Continued)

(52) U.S. Cl.
CPC ............ *H04L 61/3005* (2013.01); *H04L 45/74* (2013.01); *H04L 49/15* (2013.01); *H04L 61/2589* (2013.01)

(58) Field of Classification Search
CPC . H04L 61/3005; H04L 49/15; H04L 61/2589; H04L 45/74
USPC ....................................................... 370/395.54
See application file for complete search history.

(56) References Cited

U.S. PATENT DOCUMENTS

| 7,379,458 B2 * | 5/2008 | Inoue ................ H04L 29/12377 370/352 |
| 2003/0009559 A1 * | 1/2003 | Ikeda ...................... H04L 29/06 709/225 |

(Continued)

FOREIGN PATENT DOCUMENTS

| EP | 2 642 701 A1 | 9/2013 |
| EP | 2 685 673 A1 | 1/2014 |

(Continued)

OTHER PUBLICATIONS

Official Communication issued in International Patent Application No. PCT/JP2012/007382, mailed on Dec. 11, 2012.
(Continued)

*Primary Examiner* — Phuc Tran
(74) *Attorney, Agent, or Firm* — Keating & Bennett, LLP

(57) ABSTRACT

A relay server stores a first routing target address, and stores a second routing target address in association with a virtual address assigned to the second routing target address. The relay server exchanges address filter information with a relay server belonging to a selected VPN group, and establishes a routing session with the relay server. The relay server determines whether or not there is an overlap between the routing target addresses. Upon determination that there is an overlap, the relay server assigns a virtual address to the second routing target address. The relay server uses the virtual address to perform communication between the relay server itself and a first routing target device.

6 Claims, 14 Drawing Sheets

(51) Int. Cl.
*H04L 12/933* (2013.01)
*H04L 12/741* (2013.01)

(56) References Cited

U.S. PATENT DOCUMENTS

| | | |
|---|---|---|
| 2003/0145104 A1 | 7/2003 | Boden et al. |
| 2007/0180139 A1 | 8/2007 | Oguchi et al. |
| 2008/0198858 A1 | 8/2008 | Townsley et al. |
| 2008/0201486 A1* | 8/2008 | Hsu .................. H04L 29/06 709/238 |
| 2008/0298367 A1 | 12/2008 | Furukawa |
| 2009/0016360 A1 | 1/2009 | Kurita |
| 2012/0057602 A1 | 3/2012 | Tanimoto |
| 2012/0185603 A1 | 7/2012 | Tanimoto |

FOREIGN PATENT DOCUMENTS

| | | |
|---|---|---|
| JP | 2010-278636 A | 12/2010 |
| JP | 2011-077842 A | 4/2011 |
| JP | 2011-160103 A | 8/2011 |
| JP | 2011-223413 A | 11/2011 |
| WO | 2009/116945 A1 | 9/2009 |

OTHER PUBLICATIONS

Official Communication issued in corresponding European Patent Application No. 12854112.5, mailed on Sep. 9, 2015.

* cited by examiner

Fig.3

```
<?xml version="1.0" encoding="UTF-8" ?>
-<root>
   -<group id="group-a@relaysystem.net"                    ┐ 511
       lastmod="20090402133100" name="GROUP A">            ┘
      <site id="server1@relaysystem.net" rel="allow"/>     ┐
      <site id="server2@relaysystem.net" rel="allow"/>     ├ 512
      <site id="server3@relaysystem.net" rel="allow"/>     ┘
   </group>
</root>
```

Fig.4

```
<?xml version="1.0" encoding="UTF-8" ?>
-<root>
   -<site id="server1@relaysystem.net"                                      ┐ 521
       name="RELAY SERVER 1" stat="active">                                 ┘
      -<node group="group-a@relaysystem.net"                                ┐
         id="client13@server1.net"                                          ├ 522
         name="CLIENT 13" site="server1@relaysystem.net"/>                  ┘
   </site>
   -<site id="server2@relaysystem.net"                                      ┐ 521
       name="RELAY SERVER 2" stat="active">                                 ┘
      -<node group="group-a@relaysystem.net"                                ┐
         id="client22@server2.net"                                          ├ 522
         name="CLIENT 22" site="server2@relaysystem.net"/>                  ┘
   </site>
   -<site id="server3@relaysystem.net"                                      ┐ 521
       name="RELAY SERVER 3" stat="active">                                 ┘
      -<node group="group-a@relaysystem.net"                                ┐
         id="client34@server3.net"                                          ├ 522
         name="CLIENT 34" site="server3@relaysystem.net"/>                  ┘
   </site>
</root>
```

Fig.5

(a)
```
<?xml version="1.0" encoding="UTF-8" ?>
-<root>
  -<node addr="192.168.0.3"
     group="group-a@relaysystem.net"
     id="client13@server1.net"
     name="CLIENT 13" pass="abc" port="5070">
   </node>
  </root>
```

(b)
```
<?xml version="1.0" encoding="UTF-8" ?>
-<root>
  -<node addr="172.158.0.20"
     group="group-a@relaysystem.net"
     id="client22@server2.net"
     name="CLIENT 22" pass="abc" port="5070">
   </node>
  </root>
```

(c)
```
<?xml version="1.0" encoding="UTF-8" ?>
-<root>
  -<node addr="192.168.0.40"
     group="group-a@relaysystem.net"
     id="client34@server3.net"
     name="CLIENT 34" pass="abc" port="5070">
   </node>
  </root>
```

Fig.6

```
<?xml version="1.0" encoding="UTF-8"?>
-<root>
  -<vnet group="group-a@relaysystem.net"         ⎫
     id="vpn-group-1@relaysystem.net"            ⎬ 541
     lastmod="20090410162500" name="VPN-GROUP 1">⎭
   <rp id="server1@relaysystem.net"/>            ⎫ 542
   <rp id="server3@relaysystem.net"/>            ⎭
   <ssn sp="server3@relaysystem.net"             ⎫ 543
     ep="server1@relaysystem.net"/>              ⎭
   </vnet>
  </root>
```

| ADDRESS FILTER INFORMATION | |
|---|---|
| ROUTING TARGET ADDRESS | NAME |
| 192.168.0.1 | OPERATION PC 11 |
| 192.168.0.2 | OPERATION PC 12 |

(b)

| ADDRESS FILTER INFORMATION | |
|---|---|
| ROUTING TARGET ADDRESS | NAME |
| 172.158.0.10 | OPERATION PC 21 |

(c)

| ADDRESS FILTER INFORMATION | |
|---|---|
| ROUTING TARGET ADDRESS | NAME |
| 192.168.0.10 | TARGET TERMINAL 31 |
| 192.168.0.20 | TARGET TERMINAL 32 |
| 192.168.0.30 | TARGET TERMINAL 33 |

CONTENT STORED IN RELAY SERVER 1

| TERMINAL ID OF ROUTING APPARATUS | ADDRESS FILTER INFORMATION | |
|---|---|---|
| | ROUTING TARGET ADDRESS | NAME |
| server1@relaysystem.net | 192.168.0.1 | OPERATION PC 11 |
| | 192.168.0.2 | OPERATION PC 12 |
| server3@relaysystem.net | 192.168.0.10 | TARGET TERMINAL 31 |
| | 192.168.0.20 | TARGET TERMINAL 32 |
| | 192.168.0.30 | TARGET TERMINAL 33 |

(b)

CONTENT STORED IN RELAY SERVER 1

| TERMINAL ID OF ROUTING APPARATUS | ADDRESS FILTER INFORMATION | | VIRTUAL ADDRESS |
|---|---|---|---|
| | ROUTING TARGET ADDRESS | NAME | |
| server1@relaysystem.net | 192.168.0.1 | OPERATION PC 11 | — |
| | 192.168.0.2 | OPERATION PC 12 | — |
| server3@relaysystem.net | 192.168.0.10 | TARGET TERMINAL 31 | 150.100.0.10 |
| | 192.168.0.20 | TARGET TERMINAL 32 | 150.100.0.20 |
| | 192.168.0.30 | TARGET TERMINAL 33 | 150.100.0.30 |

CONTENT STORED IN RELAY SERVER 3

| TERMINAL ID OF ROUTING APPARATUS | ADDRESS FILTER INFORMATION | |
|---|---|---|
| | ROUTING TARGET ADDRESS | NAME |
| server1@relaysystem.net | 192.168.0.1 | OPERATION PC 11 |
| | 192.168.0.2 | OPERATION PC 12 |
| server3@relaysystem.net | 192.168.0.10 | TARGET TERMINAL 31 |
| | 192.168.0.20 | TARGET TERMINAL 32 |
| | 192.168.0.30 | TARGET TERMINAL 33 |

(b)

CONTENT STORED IN RELAY SERVER 3

| TERMINAL ID OF ROUTING APPARATUS | ADDRESS FILTER INFORMATION | | VIRTUAL ADDRESS |
|---|---|---|---|
| | ROUTING TARGET ADDRESS | NAME | |
| server1@relaysystem.net | 192.168.0.1 | OPERATION PC 11 | 160.90.0.1 |
| | 192.168.0.2 | OPERATION PC 12 | 160.90.0.2 |
| server3@relaysystem.net | 192.168.0.10 | TARGET TERMINAL 31 | – |
| | 192.168.0.20 | TARGET TERMINAL 32 | – |
| | 192.168.0.30 | TARGET TERMINAL 33 | – |

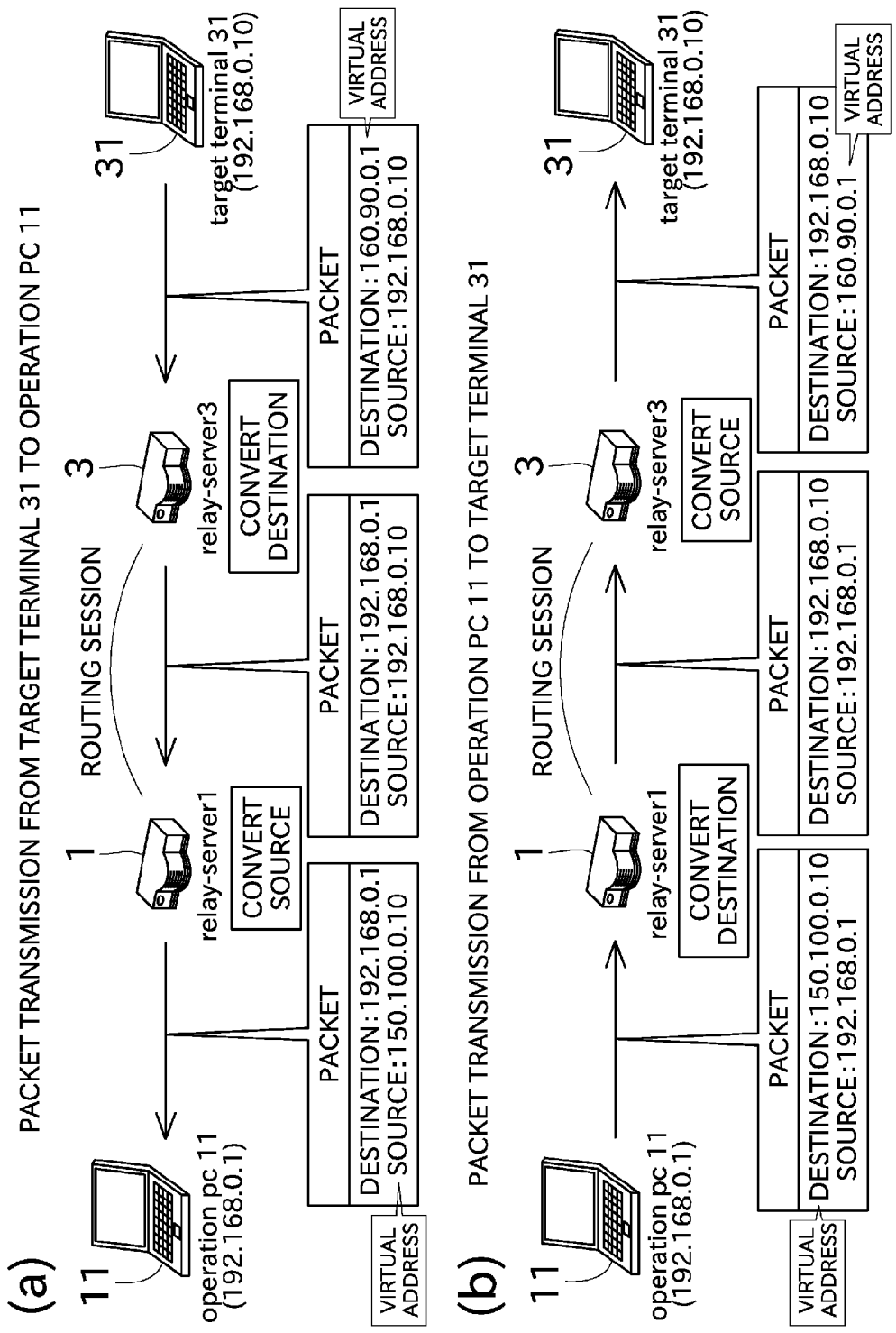

RELAY SERVER AND RELAY COMMUNICATION SYSTEM

BACKGROUND OF THE INVENTION

1. Field of the Invention

The present invention relates to a relay server that enables communication to be performed between apparatuses connected to different LANs (Local Area Networks).

2. Description of the Related Art

Conventionally, a communication technology called a virtual private network (Virtual Private Network, VPN) has been known, which allows communication to be performed between LANs installed in physically distant places. Japanese Patent Application Laid-Open No. 2010-268312 shows an example in which a relay server, a communication terminal, and the like, are connected to each of a plurality of LANs installed in physically distant places. With the use of the VPN, a communication terminal is able to transmit a packet to a communication terminal connected to another LAN. More specifically, a packet transmitted by a communication terminal is firstly sent to a relay server belonging to a LAN that the communication terminal belongs to. This relay server transmits (forwards) the packet, via Internet, to a relay server belonging to a LAN that a destination communication terminal belongs to. The relay server receives the packet, and transmits (forwards) the packet to the destination communication terminal.

Use of the VPN enables another LAN located in a distant place to be used as if it is a directly-connected network.

In this type of system, communication between terminals is performed with the use of IP addresses (private IP addresses) of terminals that are connected to LANs. The IP addresses are assigned without any overlap in the same LAN, but may overlap among terminals that are connected to different LANs. In such a case, two or more identical IP addresses exist in the VPN, which makes it impossible to perform proper communication.

To avoid such a situation, conventionally, when there are overlapping IP addresses, the VPN is once terminated and then re-setting of IP addresses is performed. This puts a burden on a user, because the user has to perform the setting by hand each time overlapping IP addresses are detected.

SUMMARY OF THE INVENTION

In view of the circumstances described above, preferred embodiments of the present invention provide a relay server that is able to start communication without requiring setting to be performed by a user, even in a case where LANs having overlapping addresses are connected.

In a first aspect of a preferred embodiment of the present invention, a relay server having the following configuration is provided. The relay server includes an address filter information storage unit, a virtual address assignment information storage unit, a VPN group information storage unit, and a control unit. The address filter information storage unit is configured to store a first routing target address and a second routing target address. The first routing target address is an address of a first routing target device that is located in a first LAN and to which the relay server is able to forward a packet. The second routing target address is an address of a second routing target device that is located in a second LAN and to which a second relay server is able to forward a packet. The virtual address assignment information storage unit is configured to store a second routing target address in association with a virtual address assigned to the second routing target address. The VPN group information storage unit is configured store VPN group information that is information concerning a relay server selected as a routing point. The control unit is programmed and configured to perform a control to select a VPN group (in response to a user's instruction or the like). The control unit is programmed and configured to transmit the first routing target address to the second relay server belonging to the selected VPN group, receive the second routing target address from the second relay server, and establish a routing session with the second relay server. The control unit is programmed and configured to perform a determination process to determine whether or not there is an overlap between the first routing target address and the second routing target address. In a case where the determination process results in a determination that there is an overlap, the control unit assigns the virtual address to the second routing target address and stores the relationship of assignment into the virtual address assignment information storage unit. When a packet whose destination is the virtual address is received from the first routing target device, the control unit refers to the virtual address assignment information storage unit, converts a destination address of the packet into the second routing target address associated with the virtual address, and forwards the packet to the routing session. When a packet whose destination is the first routing target address is received from the routing session, the control unit refers to the virtual address assignment information storage unit, converts a source address of the packet into the virtual address assigned to the second routing target address if the virtual address is assigned, and forwards the packet to the first routing target device that is the destination.

Accordingly, even when the first routing target address and the second routing target address overlap, relay communication via the routing session is started without requiring the user to change the setting by hand. This saves the labor of changing the routing target address and the labor of re-performing the process for starting the relay communication. Therefore, the relay communication is started smoothly. Additionally, whether or not the use of the virtual address is necessary is determined with respect to the selected VPN group (for which the communication is started). This enables the virtual address to be used only when needed. Particularly, the detection of overlapping addresses is performed after the VPN group is started and the address filter information is exchanged. Therefore, the virtual address is used based on the latest address of the relay server belonging to the VPN group.

In the relay server, it is preferable that, in a case where the determination process results in a determination that there is an overlap, the control unit generates the virtual address in consideration of a content stored in the address filter information storage unit, and assigns the generated virtual address to the second routing target address.

Since the content stored in the address filter information storage unit is considered, a virtual address that avoids an overlap with any used addresses is reliably generated without fail.

The relay server is preferably configured as follows. The relay server preferably includes a virtual address registration information storage unit that stores the virtual address that is registered in advance. In a case where the determination process results in a determination that there is an overlap, the control unit assigns the virtual address stored in the virtual address registration information storage unit to the second routing target address.

Accordingly, the range of addresses usable as the virtual address preferably is defined in advance. Thus, addresses available in a case of, for example, providing an additional LAN, are ensured. Moreover, it is not necessary to generate a virtual address each time the relay communication is started. This significantly reduces the processing performed by the control unit.

In the relay server, it is preferable that, even in a case where routing target addresses are not completely identical, the control unit determines that there is an overlap when the routing target addresses have the same network address.

In a case where, for example, routing target addresses have the same network address and different host addresses, a situation can occur that two addresses that are completely identical are used as a result of, for example, an additional routing target device being provided. In this respect, the above-described configuration determines that there is an overlap when the network addresses are identical. Accordingly, an overlap between addresses is sensed before it occurs, and a virtual address is assigned in advance.

The relay server is preferably configured as follows. The relay server receives the second routing target address from the second relay server belonging to a selected VPN group, and receives a third routing target address from a third relay server belonging to the VPN group. In the determination process, whether or not there is an overlap among the first routing target address, the second routing target address, and the third routing target address is determined.

Accordingly, even when a selected VPN group includes three or more relay servers, an overlap between routing target addresses is detected and a virtual address is assigned.

In a second aspect of a preferred embodiment of the present invention, a relay communication system including a first relay server and a second relay server and having the following configuration is provided. The first relay server located in a first LAN includes an address filter information storage unit, a virtual address assignment information storage unit, and a control unit. The address filter information storage unit is configured to store a first routing target address and a second routing target address. The first routing target address is an address of a first routing target device to which the first relay server is able to forward a packet. The second routing target address is an address of a second routing target device to which the second relay server located in a second LAN is able to forward a packet. The virtual address assignment information storage unit is configured to store a second routing target address in association with a virtual address assigned to the second routing target address. The control unit is programmed and configured to transmits the first routing target address to the second relay server, receive the second routing target address from the second relay server, and establish a routing session with the second relay server. The control unit is programmed and configured to perform a determination process to determine whether or not there is an overlap between the first routing target address and the second routing target address. In a case where the determination process results in a determination that there is an overlap, the control unit assigns the virtual address to the second routing target address and stores the relationship of assignment into the virtual address assignment information storage unit. When a packet whose destination is the virtual address is received from the first routing target device, the control unit refers to the virtual address assignment information storage unit, converts a destination address of the packet into the second routing target address associated with the virtual address, and forwards the packet to the routing session. When a packet whose destination is the first routing target address is received from the routing session, the control unit refers to the virtual address assignment information storage unit, converts a source address of the packet into the virtual address assigned to the second routing target address if the virtual address is assigned, and forwards the packet to the first routing target device that is the destination.

Accordingly, even when the first routing target address and the second routing target address overlap, relay communication via the routing session is started without requiring the user to change the setting by hand. This saves the labor of changing the routing target address and the labor of re-performing the process for starting the relay communication. Therefore, the relay communication is started smoothly. Additionally, whether or not the use of the virtual address is necessary is determined with respect to the selected VPN group (for which the communication is started). This enables the virtual address to be used only when needed. Particularly, the detection of overlapping addresses is performed after the VPN group is started and the address filter information is exchanged. Therefore, the virtual address is used based on the latest address of the relay server belonging to the VPN group.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 3 is a diagram showing a content of relay group information.

FIG. 4 is a diagram showing a content of relay server information.

FIGS. 5A-5C are diagrams showing a content of client terminal information.

FIG. 6 is a diagram showing a content of VPN group information.

FIGS. 7A-7C are diagrams showing a content of address filter information that is registered in each relay server in advance.

FIGS. 8A and 8B are diagrams showing address filter information and virtual addresses that are stored in a relay server 1 after a VPN is defined or provided.

FIGS. 9A and 9B are diagrams showing address filter information and virtual addresses that are stored in a relay server 3 after a VPN is defined or provided.

FIGS. 10A and 10B are diagrams showing a content of virtual address registration information.

FIGS. 17A and 17B are explanatory diagrams showing a routing control with the use of virtual addresses.

DETAILED DESCRIPTION OF THE PREFERRED EMBODIMENTS

Figure 1:
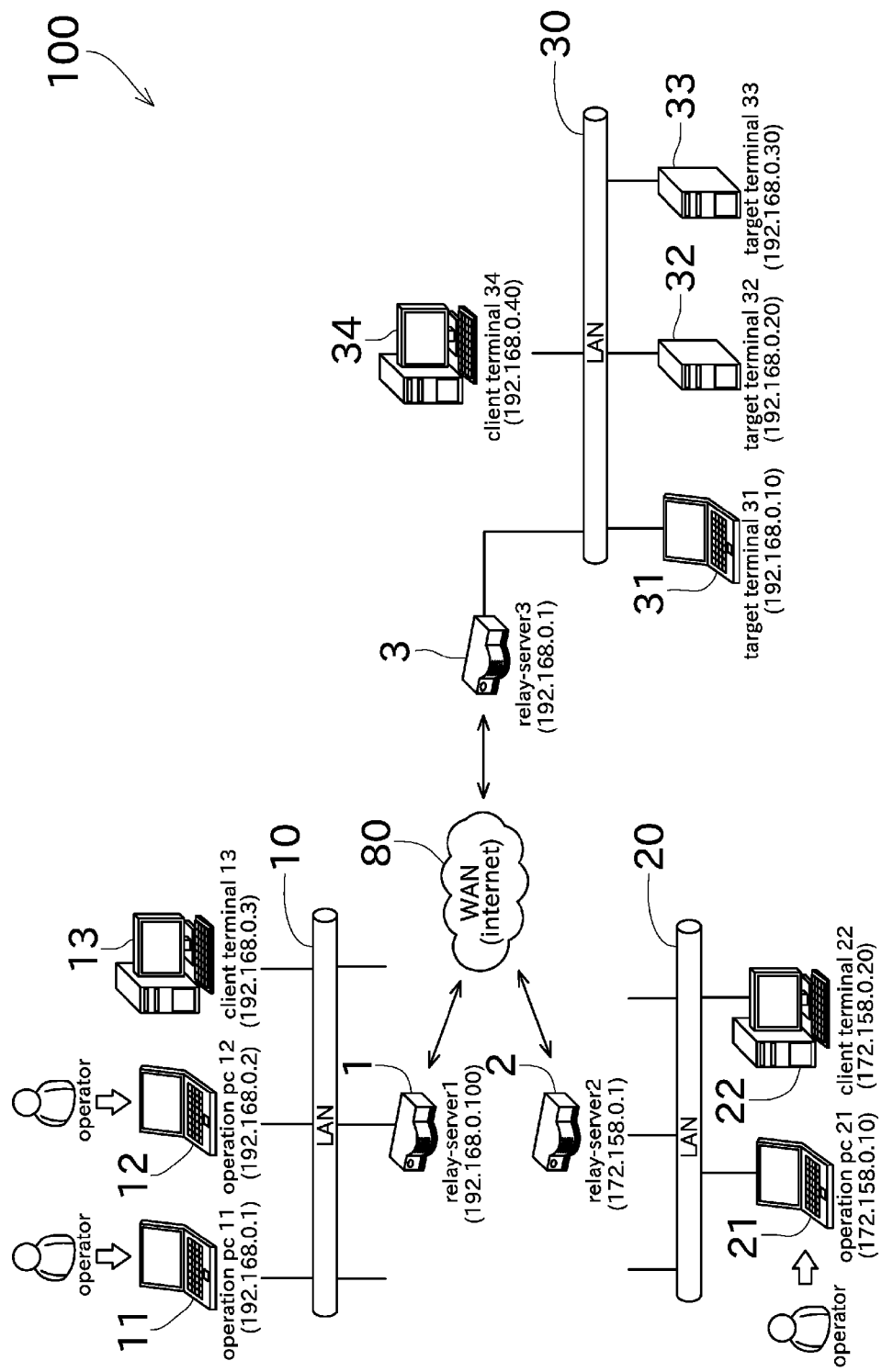
FIG. 1 is an explanatory diagram showing an overall configuration of a relay communication system according to a preferred embodiment of the present invention.

Next, preferred embodiments of the present invention will be described with reference to the drawings. Firstly, with reference to FIG. 1, an outline of a relay communication system 100 according to the present preferred embodiment will be described. FIG. 1 is an explanatory diagram showing an overall configuration of a relay communication system 100 according to the present preferred embodiment.

As shown in FIG. 1, the relay communication system 100 includes a plurality of LANs 10, 20, and 30 that are connected to a Wide Area Network (WAN, Wide Area Network) 80. Each of the LANs 10, 20, and 30 preferably is a relatively small network provided in a limited place. The LANs 10, 20, and 30 are located in physically distant places. In this preferred embodiment, the Internet is preferably used as the WAN 80.

In the following, a specific description will be provided for each of the LANs. As shown in FIG. 1, a relay server (second relay server) 1, operation PCs 11 and 12 defining and serving as second routing target devices, and a client terminal 13 are connected to the LAN (second LAN) 10. A relay server 2, an operation PC 21, and a client terminal 22 are connected to the LAN 20. A relay server (first relay server) 3, target terminals 31, 32, and 33 defining and serving as first routing target devices, and a client terminal 34 are connected to the LAN (first LAN) 30.

Each of the relay servers 1, 2, and 3 is connected not only to each of the LANs 10, 20, and 30 but also to the WAN 80, and therefore able to communicate not only with the apparatuses connected to the same LAN but also with the relay servers connected to the other LANs. The operation PCs 11, 12, and 21 preferably are, for example, personal computers that can be operated by operators. The target terminals 31, 32, and 33 preferably are personal computers, file servers, or the like, for example. In an assumed case, for example, the operator operates the operation PC 11 to request predetermined data from the target terminal 31 and update a content stored in the target terminal 31. The client terminals 13, 22, and 34, which are configured as personal computers for example, are able to communicate with one another via the relay servers 1, 2, and 3 that they belong to.

Figure 2:
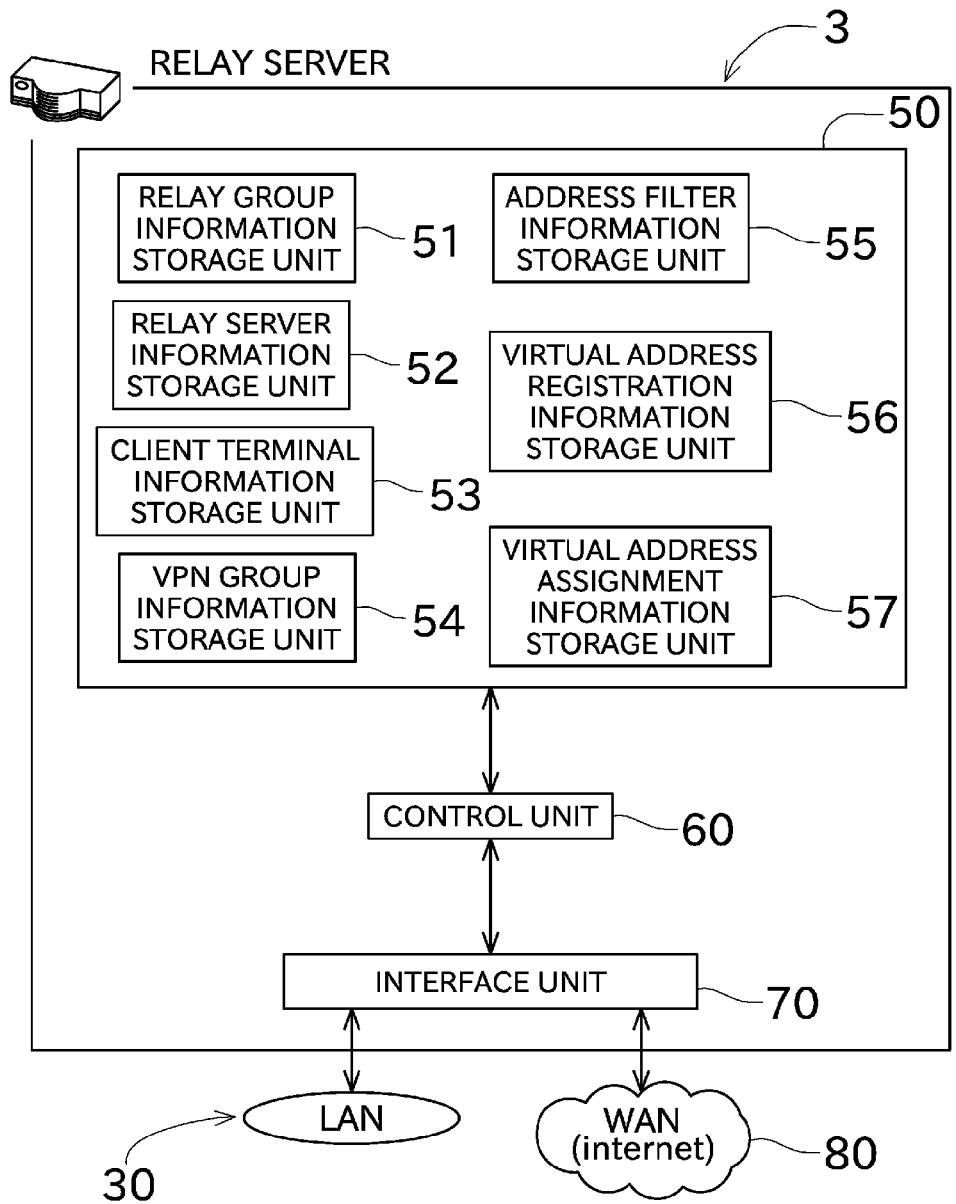
FIG. 2 is a function block diagram of a relay server.

Next, detailed configurations of the relay servers 1, 2, and 3 will be described with reference to FIG. 2. FIG. 2 is a function block diagram of the relay server 3. Since the configuration of the relay server 3 preferably is the same or substantially the same as the configurations of the relay servers 1 and 2, the following description will focus mainly on the relay server 3.

As shown in FIG. 2, the relay server 3 preferably includes a storage unit 50, a control unit 60, and an interface unit 70.

The interface unit 70 performs communication with the terminals included in the LAN 30. The interface unit 70 also performs communication with the WAN 80. The interface unit 70 performs an appropriate process on a packet received from the LAN 30 or the WAN 80, and outputs a resulting to the control unit 60.

The control unit 60 is, for example, a CPU with control and computation functions, and able to execute various kinds of processing based on a program or programs read out from the storage unit 50. The control unit 60 is programmed and configured to control various kinds of communication in accordance with a protocol such as TCP/IP, UDP, or SIP. More specifically, the control unit 60 is programmed and configured to determine a destination of the received packet based on information indicated by the packet and information stored in the storage unit 50, and transmit the packet to the determined destination. The control unit 60 is also programmed and configured to update a content stored in the storage unit 50 based on information received from another terminal.

The storage unit 50 is, for example, configured as a hard disk or a non-volatile RAM, and able to store various types of data. The storage unit 50 includes a relay group information storage unit 51, a relay server information storage unit 52, a client terminal information storage unit 53, a VPN group information storage unit 54, an address filter information storage unit 55, a virtual address registration information storage unit 56, and a virtual address assignment information storage unit 57. Hereinafter, a content stored in the storage unit 50 will be described with reference to FIGS. 3 to 10. FIGS. 3 to 10 are mainly diagrams showing contents stored in the storage unit 50 of the relay server 3.

The relay group information storage unit 51 stores relay group information indicating a relay group and a relay server that forms this relay group.

As shown in FIG. 3, in the relay group information, a group tag and site tags that are child elements whose parent element is the group tag are described. In the group tag, group information 511 concerning a relay group is described. As the group information 511, identification information ("id") of the relay group, a last modification time ("lastmod"), and a name ("name") of the relay group, are described. In the site tags, group configuration information 512 concerning relay servers that define the relay group is described. In the group configuration information 512, identification information ("id") of these relay servers is described. An additional relay group can be provided. In such a case, a new relay group is given unique identification information different from those of the other relay groups. This enables such setting that, for example, data exchange is performed only within a specific relay group.

The relay group information is shared among the relay servers 1, 2, and 3 that define a particular relay group. In a case where a certain relay server performs a process to change the relay group, it is transmitted to the other relay servers and the relay group information is updated. In this manner, the relay group information is dynamically shared.

The relay server information storage unit 52 is configured to store relay server information indicating an outline of a relay server that performs relay communication and a client terminal that belongs to this relay server.

In the relay server information shown in FIG. 4, site tags each described for each relay server, and node tags that are child elements whose parent elements are the site tags, are described. In the site tag, server information 521 concerning the relay server 1 is described. As the server information 521, identification information ("id") of the relay server, a name ("name") of the relay server, and start-up information ("stat"), are described. The "stat" being "active" indicates that the relay server logs in to the relay communication system 100, and the "stat" being blank indicates that the relay server is logging off. In the node tag that is the child element of the site tag, belonging information 522 indicating a client terminal belonging to the relay server is described. As the belonging information 522, a name ("group") of the relay group to which a client terminal belongs, identification information ("id") of the client terminal, a name ("name") of the client terminal, and identification information ("site") of the relay server to which the client terminal belongs, are described. When the client terminal does not log in to the relay communication system 100, the "site" is blank.

Communication by the relay group is performed based on the above-described relay group information and relay server information, in the following manner. For example, in a case where a packet is transmitted from the client terminal 13 to the client terminal 22, the client terminal 13 firstly transmits a packet to the relay server 1 that is the relay server to which the client terminal 13 itself is connected. Here, a relay server capable of packet exchange preferably is recognized based on the above-described relay group information. The identification information of a client terminal belonging to the relay server, and whether or not the client terminal is connected, preferably is determined based on the above-described relay server information. Based on such information, the relay server 1 forwards the packet to the relay server 2 that is the relay server to which the client terminal 22 is connected. Then, the relay server 2 receives the packet, and forwards the packet to the client terminal 22. As a result, relay communication is performed between the client terminals 13 and 22.

As for the relay server information as well as the relay group information, the information is shared among the relay servers 1, 2, and 3 that define this relay group. In a case where a certain relay server performs a process to change the relay server information, it is transmitted to the other relay servers and the relay server information is updated. In this manner, the relay server information is dynamically shared.

The client terminal information storage unit 53 stores client terminal information that is detailed information concerning a client terminal. Each of the relay servers 1, 2, and 3 stores the client terminal information concerning only the client terminal belonging to itself. Since the client terminal 34 belongs to the relay server 3, the client terminal information storage unit 53 included in the relay server 3 stores only the client terminal information of the client terminal 34.

The client terminal information stored in the client terminal information storage unit 53 of the relay server 3 is shown in FIG. 5C. Likewise, the client terminal information stored in the relay server 1 is shown in FIG. 5A, and the client terminal information stored in the relay server 2 is shown in FIG. 5B.

In the client terminal information shown in FIGS. 5A-5C, a node tag is described. In the node tag, a private IP address ("addr") of a client terminal, a name ("group") of a relay group to which the client terminal belongs, identification information ("id"), a name ("name"), a passcode ("pass") for logging in to a relay server, and port information ("port"), are described.

The VPN group information storage unit 54 stores VPN group information that is information concerning a VPN group of apparatuses (hereinafter referred to as routing apparatuses) that are selected as routing points from client terminals and relay servers that define a relay group. Establishing a routing session among routing apparatuses that belong to the same VPN group allows communication with the use of a VPN to be started.

In the VPN group information shown in FIG. 6, a vnet tag is described. In the vnet tag, VPN group basic information 541, routing point information 542, and routing session information 543, are described. In the VPN group basic information 541, a name ("group") of a relay group to which a VPN group belongs, identification information ("id") of the VPN group, a last modification time ("lastmod"), and a name ("name") of the VPN group, are described. In the routing point information 542, identification information of routing apparatuses that perform routing at a time of performing communication in the VPN group is described. In an example shown in FIG. 6, the relay server 1 and the relay server 3 are described as the routing apparatuses. In the routing session information 543, the routing apparatuses that are to be connected to one another in the VPN group are described. In the routing session information 543, the routing apparatuses are defined such that they are classified into the side ("sp (start point)") that takes initiative to perform a communication control and the side ("ep (end point)") that receives the communication control during a routing session establishment process to define or provide a VPN to start communication in the VPN group. In the following description, the routing apparatus in the side that takes initiative to perform the communication control to establish the routing session may be sometimes referred to as "start point", and the routing apparatus in the side that receives such a communication control may be sometimes referred to as "end point".

The VPN group information shown in FIG. 6 indicates that the VPN group (VPN-GROUP1) includes the relay server 1 and the relay server 3. It also indicates that, at a time of starting the VPN group, a communication control to establish a routing session is performed from the relay server 3 to the relay server 1.

Any number of VPN groups may be provided or defined. In the relay communication system 100, a plurality of VPN groups may be provided or defined. For example, in addition to the above-mentioned VPN group, a VPN group including the relay server 1 and the relay server 2, a VPN group including the relay server 2 and the relay server 3, and a VPN group including the relay servers 1 to 3, may be provided or defined.

The VPN group information, as well as the relay server information and the relay group information, is shared among the relay servers 1 and 3 that belong to the same VPN group. In a case where a certain relay server performs a process to change the VPN group information, it is transmitted to the other relay servers belonging to the same VPN group, and the VPN group information is updated. In this manner, the VPN group information is dynamically shared. A process to provide or define the VPN group will be described later.

The address filter information storage unit 55 stores address filter information that is information used at a time of performing a routing control with the use of the VPN. Before the VPN is defined or provided, the address filter information storage unit 55 stores information (address filter information of the relay server 3) indicating a device (routing target device) to which the relay server 3 itself is able to directly transmit a packet. The address filter information includes an address (routing target address) of the routing target device and a name of the routing target device.

FIG. 7C shows an example of the address filter information that is registered in advance in the relay server 3 itself. In this example, the target terminals 31, 32, and 33 are apparatuses to which the relay server 3 is able to directly transmit a packet. FIG. 7A shows the address filter information that is registered in advance in the relay server 1. FIG. 7B shows the address filter information that is registered in advance in the relay server 2.

As mentioned above, before the VPN is defined or provided, only the address filter information shown in FIG. 7C is stored in the address filter information storage unit 55 of the relay server 3. When, for example, establishing a routing session with the relay server 1, the relay server 3 transmits the address filter information (FIG. 7C) registered in the relay server 3 itself in advance to the relay server 1, and receives the address filter information (FIG. 7A) from the relay server 1. Then, the relay server 3 stores the address filter information of the relay server 1 in association with the identification information of the relay server 1, into the address filter information storage unit 55.

As a result, a content shown in FIG. 9A is stored in the address filter information storage unit 55 of the relay server 3. Likewise, a content shown in FIG. 8A (the same content as that shown in FIG. 9A) is stored in the address filter information storage unit 55 of the relay server 1, too. The relay servers 1 and 3 perform a routing control based on the addresses thus obtained (details of the control will be described later). Hereinafter, a routing target address (the addresses of the terminals 31, 32, and 33) contained in the address filter information of the relay server 3 may be referred to as a first routing target address, and a routing target address (the addresses of the operation PCs 11 and 12) contained in the address filter information of the relay server 1 may be referred to as a second routing target address.

In this preferred embodiment, in a case where there is an overlap between the first routing target address and the second routing target address, the communication between the relay server 3 and the terminals 31, 32, and 33 is performed with the use of virtual addresses of the operation PCs 11 and 12, not with the use of actual addresses thereof. As for the virtual address, an address causing no overlap within the LAN 30 (an address that has not been assigned to any apparatus within the LAN 30 and that has not been reserved, either) is registered in advance, and stored in the virtual address registration information storage unit 56 of the relay server 3. In this preferred embodiment, an address shown in FIG. 10B is registered as the virtual address.

Likewise, in a case where there is an overlap between the first routing target address and the second routing target address, the communication between the relay server 1 and the operation PCs 11, 12 is performed with the use of virtual addresses of the terminals 31, 32, and 33, not with the use of actual addresses thereof. As for the virtual address, in the same manner as described above, an address causing no overlap within the LAN 10 is registered in advance, and stored in the virtual address registration information storage unit 56 of the relay server 1. In this preferred embodiment, an address shown in FIG. 10A is registered as the virtual address.

As described above, when the relay server 3, which has exchanged the address filter information and obtained the second routing target address, detects the presence of an overlap between routing target addresses, the relay server 3 assigns the virtual address to the second routing target address (actual address). As shown in FIG. 9B, the virtual address assignment information storage unit 57 stores the relationship of assignment of the virtual address to the second routing target address. Likewise, as shown in FIG. 8B, the virtual address assignment information storage unit 57 of the relay server 1 stores the relationship of assignment of the virtual address to the first routing target address.

Figures 10, 11:
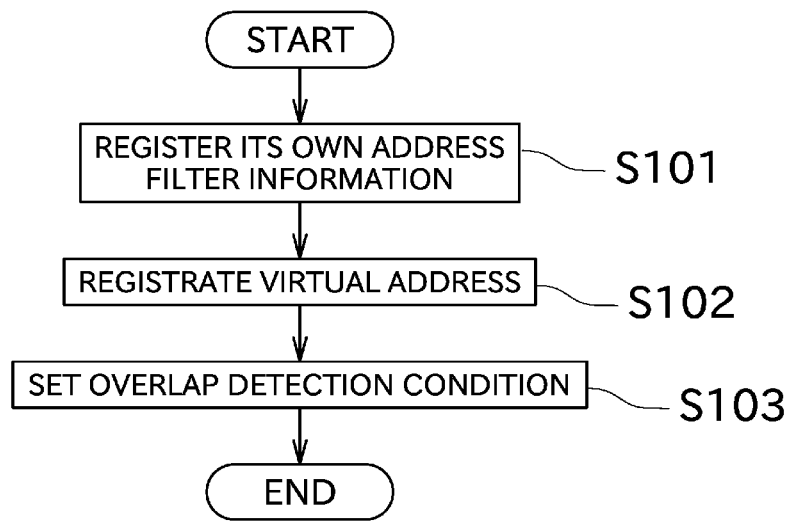
FIG. 11 is a flowchart showing the setting that is performed on the relay server in advance.
Figure 12:
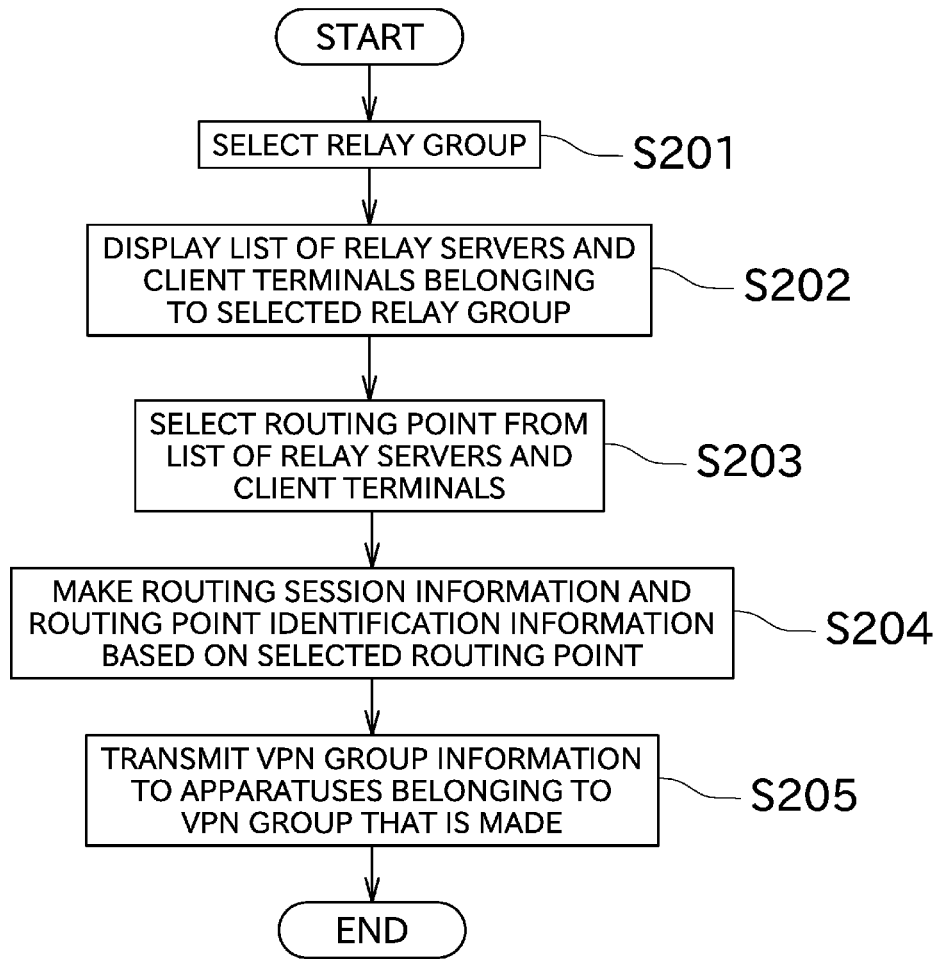
FIG. 12 is a flowchart showing a process for defining or providing a VPN group.

Next, preparation for the communication with the use of the VPN will be described. Firstly, the setting that is performed on the relay server in advance will be described with reference to FIG. 11, and next, a flow of defining or providing the VPN group will be described with reference to FIG. 12. FIG. 11 is a flowchart showing the setting that is performed on the relay server in advance. FIG. 12 is a flowchart showing a process for defining a VPN group. Although the following description takes the relay server 3 as an example and therefore describes the setting performed on the relay server 3 and the process performed by the relay server 3, the same setting is preferably performed on the relay servers 1 and 2, too, and the same process is preferably performed by the relay servers 1 and 2, too.

The setting performed on the relay server 3 in advance includes registering the address filter information of the relay server 3 (S101). For implementing the registration, the user using the relay communication system 100 inputs, by a predetermined method, the address (first routing target address) and the name of an apparatus or the like that is to be designated as a routing target device. Here, it is assumed that the user has inputted the addresses and the names of the terminals 31, 32, and 33. The address filter information registered at this time is stored in the address filter information storage unit 55.

Then, in a case of performing communication with the use of the virtual address, the user registers, as the virtual address, an address causing no overlap within the LAN 30 to which the relay server 3 is connected (S102). The virtual address registered at this time is stored in the virtual address registration information storage unit 56.

Then, the user sets an overlap detection condition (S103). The overlap detection condition is a condition used to determine that there is an overlap between routing target addresses. Examples of the overlap detection condition include the condition that "at least the network addresses are identical". The examples also include the condition that "both the network addresses and the host addresses are identical". In this preferred embodiment, it is assumed that the former condition "at least the network addresses are identical" is preferably set as the overlap detection condition.

In the following, a flow of defining or providing the VPN group will be described. Firstly, a user can display a VPN group setting screen by operating the client terminals 13, 22, 34, or the like. In a case illustrated herein, setting is performed using the client terminal 34. In the setting screen displayed on the client terminal 34, a plurality of relay groups to which this client terminal 34 belongs are displayed. The user selects, from the plurality of relay groups, a relay group in which he/she desires to define or provide a VPN group (S201).

After a relay group is selected, a list of identification information of relay servers and client terminals that belong to the selected relay group and are able to function as routing points, is displayed in a screen of the client terminal 34 (S202). Then, the user selects the relay server and the client terminal that are to function as the routing points in the VPN group to be defined or provided (S203). In the case described herein, it is assumed that the relay server 1 and the relay server 3 are selected by the user.

Based on the identification information of the selected relay servers, the identification information of the routing points and the routing session information are provided (S204). Adding the identification information of the VPN group, or the like, to the above-mentioned information results in the VPN group information shown in FIG. 6. The client terminal 34 transmits this VPN group information to the relay servers 1 and 3 belonging to the same VPN group (S205). Then, each of the relay servers 1 and 3 stores the received VPN group information into the VPN group information storage unit 54. Through the above-described steps, the process that provides or defines the VPN group is completed. Repeating the above-described processing provides or defines a plurality of VPN groups.

Figure 13:
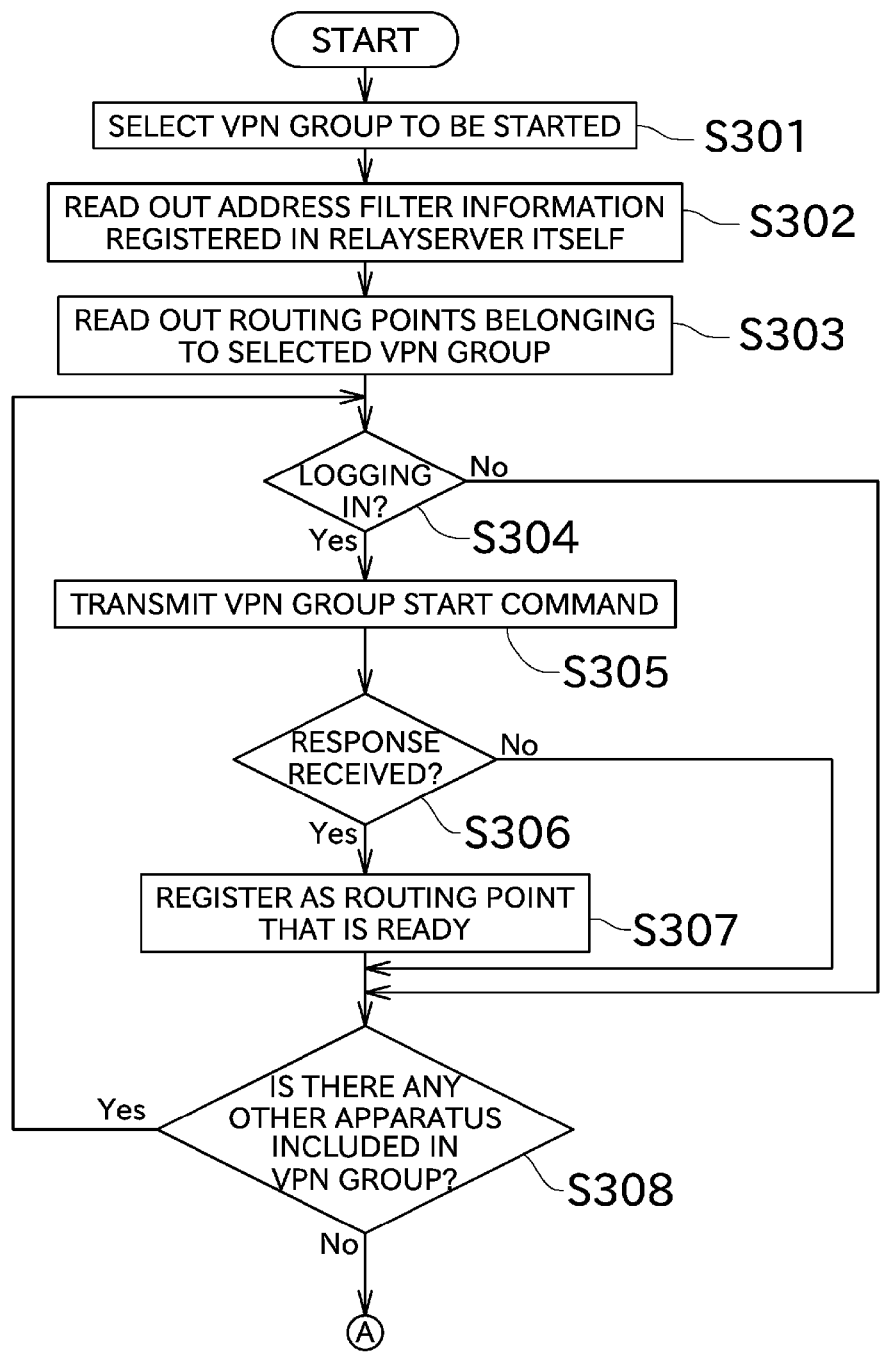
FIG. 13 is a flowchart showing a process for defining or providing a VPN.
Figure 14:
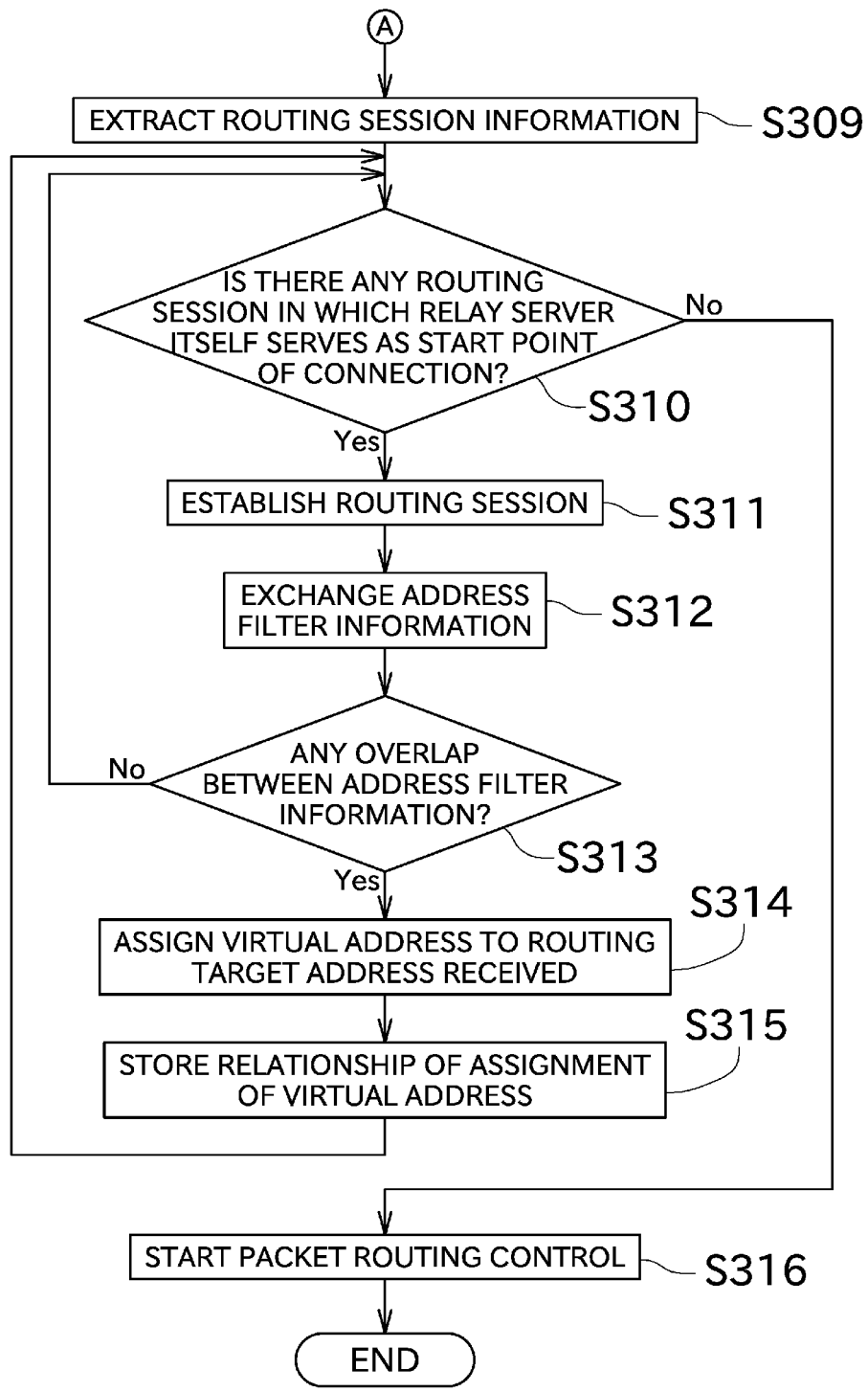
FIG. 14 is a flowchart showing a process for defining or providing a VPN.

Next, a flow until the communication with the use of the VPN is started in the VPN group thus defined will be described with reference to FIGS. 13 and 14. FIGS. 13 and 14 are flowcharts showing a process that is performed until the communication with the use of a VPN is started.

By operating the client terminal 13 and the like, or the operation PC 11 and the like, the user causes the defined VPN group (in a case where a plurality of VPN groups are defined or provided, the plurality of VPN groups) to be displayed in a screen. Then, by selecting an appropriate VPN group from the displayed VPN groups (S301), the user causes the process to provide or define the VPN to be performed. In an example case described herein, the relay server 3 performs a process to start the VPN group provided or defined in the above-described manner (the VPN group including the relay servers 1 and 3).

Firstly, the relay server 3 reads out the address filter information associated with the relay server 3 itself (S302). The information read out at this time is the content registered in S101 (the content shown in FIG. 7C). Then, the relay server 3 reads out a routing point belonging to the selected VPN group (S303). Thus, the relay server 1 is read out based on the content of the VPN group information shown in FIG. 6.

The relay server 3 determines whether or not the relay server 1 is currently logging in (whether "stat" is active or blank), based on the relay server information (S304). Since the relay server information shown in FIG. 4 indicates that the relay server 1 is currently logging in, the relay server 3 transmits a VPN-group start command together with the identification information of the VPN group to the relay server 1 (S305).

Upon reception of a response from the relay server 1 (S306), the relay server 3 registers the relay server 1 as a routing point that has been ready for defining the VPN (S307).

Then, the relay server 3 determines whether or not there is any other apparatus belonging to the same VPN group (S308). The VPN group that is currently defined or provided includes only the relay server 1 and the relay server 3, and there is no other apparatus. If there is any other apparatus, the relay server 3 performs the steps S304 to S307 on this apparatus.

Then, the relay server 3 extracts the routing session information from the content stored in the VPN group information storage unit 54 (S309 of FIG. 14). Then, referring to the extracted routing session information, the relay server 3 determines whether or not a routing session in which the relay server 3 itself serves as a start point is described therein (S310). In the routing session information shown in FIG. 6, it is described that the relay server 3 itself (relay server 3) serves as a start point in a routing session established between the relay server 1 and the relay server 3.

Accordingly, the relay server 3 performs a predetermined communication control on the relay server 1, to establish a routing session (S311). At a time of performing the communication control, as mentioned above, the address filter information is exchanged (S312). As a result, the content shown in FIG. 9A is stored in the address filter information storage unit 55 of the relay server 3. Likewise, the content shown in FIG. 8A is stored in the address filter information storage unit 55 of the relay server 1.

Then, based on the content stored in the address filter information storage unit 55, the relay server 3 performs a process (determination process) to determine whether or not there is an overlap between routing target addresses contained in the address filter information (S313). In the determination process, if "at least the network addresses are identical" according to the setting performed in S103, it is determined that there is an overlap. In this preferred embodiment, the network addresses of both of the first and second routing target addresses preferably are (192.168.0) as shown in FIG. 8A, and therefore the relay server 3 determines that there is an overlap.

In the description herein, the VPN group preferably includes two relay servers, for example. Therefore, the relay server 3 determines any overlap between the routing target addresses of these relay servers. However, in a case where a VPN group includes a plurality of relay servers and this VPN group is selected in S301, the relay server 3 detects any overlap among the three routing target addresses, for example. Thus, in this preferred embodiment, an overlap of addresses is detected only for the selected VPN group.

When it is determined that there is an overlap between the routing target addresses, the relay server 3 assigns the virtual address to the second routing target address (S314), and stores the relationship of assignment into the virtual address assignment information storage unit 57 (S315). The virtual address assigned in S314 may be any address as long as it is a virtual address that has been registered in the virtual address registration information storage unit 56 and that has not been assigned to the second routing target address yet.

Then, the relay server 3 performs the processing of S310 again. Also when it is determined that there is no overlap between the routing target addresses, the processing of S310 is performed again. Since the VPN group that is currently defined or provided includes only the relay server 1 and the relay server 3, the VPN group information does not describe any other routing session. Accordingly, the relay server 3 starts a packet routing control (S316). If there is any other routing session, the relay server 3 performs the processing of S311 to S315 again.

As thus far described, in this preferred embodiment, whether or not there is an overlap between the routing target addresses of the selected VPN group is detected, and when there is any overlap, the virtual address is assigned automatically. This allows the user to start communication with the use of the VPN without changing the setting by hand, even in a case where there is any overlap between the routing target addresses. This determination process is performed, at an appropriate timing (such as a timing of update of the address filter information), not only at a time of starting the VPN but also after the VPN is started.

In this preferred embodiment, in providing or defining a VPN, each of the routing apparatuses is able to exchange (obtain) the address filter information with the other routing apparatuses, and therefore the VPN is provided or defined using the latest address filter information. Accordingly, even in a case where the address filter information concerning some of the routing apparatuses has been changed before the VPN was started, the VPN is defined or provided and the communication is started under a state where such a change is reflected in all the routing apparatuses. This prevents inconsistency in the routing of a packet, and improves the reliability.

When, in S310, there is no routing session in which the relay server 3 itself serves as a start point of the connection (when the relay server 3 itself serves as an end point of the routing), the processing performed to establish a routing session and the exchange of the address filter information are performed under communication control performed by the routing apparatus serving as a start point, though not shown in the flowchart of FIG. 14. At the same time, in a case of performing the communication with the use of the virtual address, the assignment of the virtual address is also performed. Thus, the relay server 1 also performs a control to assign a virtual address to the first routing target address and store it.

Each of the routing apparatuses does not perform an initial communication control to establish a routing session unless it is described in the routing session information that itself should be a start point. This prevents collision of the communication control, and establishes a routing session between apparatuses through by performing simple control.

Next, a packet routing process with the use of the established routing session will be described. Although the following description takes the relay server 3 as an example and therefore describes the process performed by the relay server 3, the same or similar process preferably can be performed by the relay servers 1 and 2, too.

Figure 15:
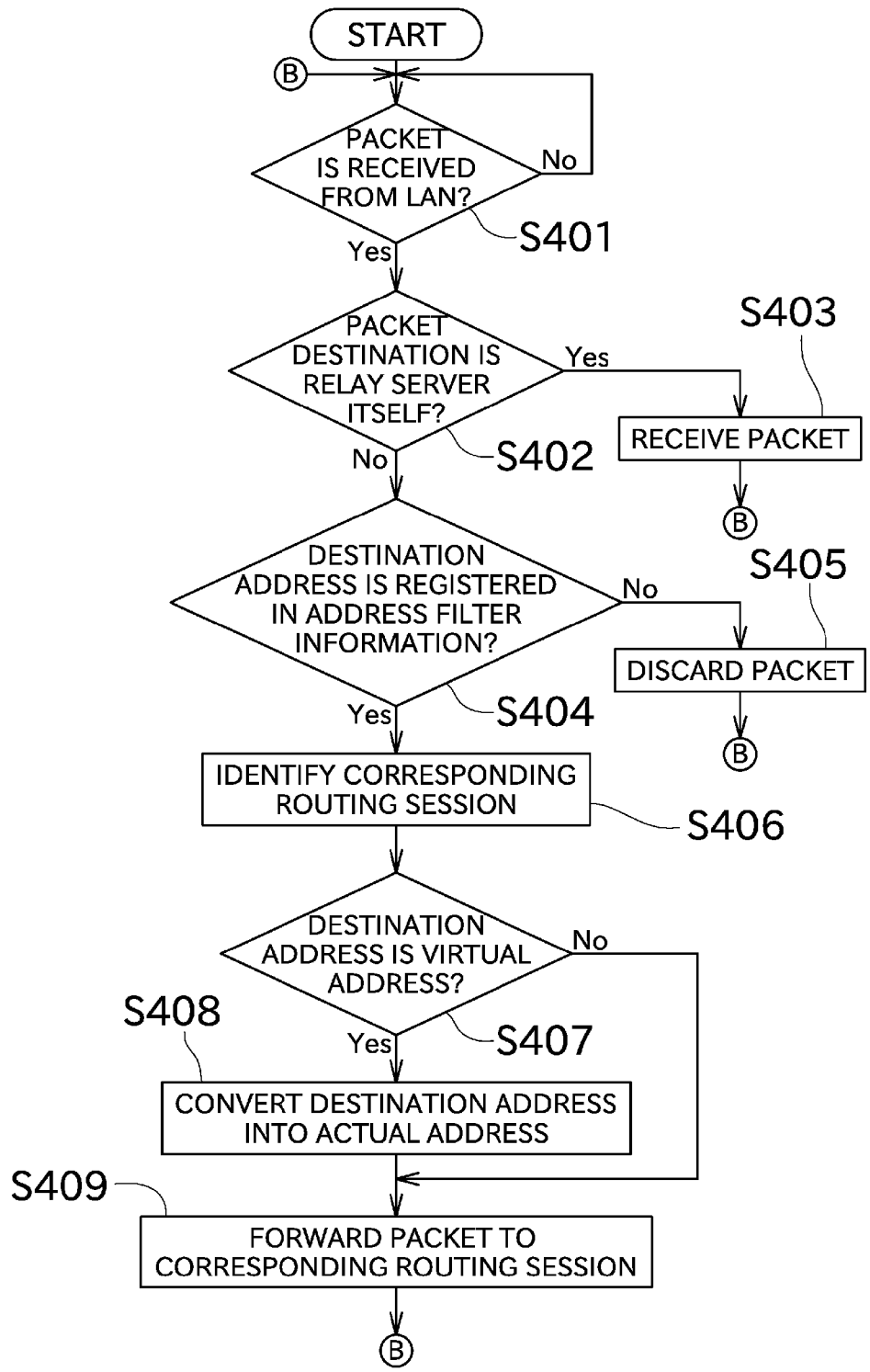
FIG. 15 is a flowchart showing a routing control that the relay server performs upon reception of a packet from a LAN.

Firstly, a control performed when the relay server 3 receives a packet from the LAN 30 will be described with reference to FIG. 15. FIG. 15 is a flowchart showing a flow of this control.

The routing target device within the LAN 30, when transmitting a packet to another routing target device, refers to the information registered in the relay server 3 to obtain another routing target address, and transmits the packet to this routing target address as the destination. At this time, in a case where a virtual address is assigned, not the actual address but the virtual address is outputted from the relay server 3 to the routing target device within the LAN 30. Therefore, for example, in a case where a packet is transmitted from the target terminal 31 to the operation PC 11, the target terminal 31 obtains the virtual address (160.90.0.1) as a destination address.

The relay server 3 waits until the packet is received from the LAN 30 (S401). When the packet is received from the LAN 30, the relay server 3 firstly determines whether or not the destination of this packet is itself (relay server 3) (S402).

In a case where the packet destination is the relay server 3 itself, the relay server 3 receives the packet (S403). In a case where the packet destination is not the relay server 3 itself, the relay server 3 compares the destination address of the received packet with the address filter information (see FIG. 9(B)), and determines whether or not the destination address is registered in the address filter information (S404). In a case where the destination address is not registered in the address filter information, the relay server 3 discards the packet (S405). In a case where the destination address is registered in the address filter information, the relay server 3 identifies the routing session corresponding to this address filter information (S406).

Then, the relay server 3 refers to the virtual address assignment information storage unit 57, to determine whether or not the destination address is a virtual address (S407). In a case where the destination address is a virtual address, the relay server 3 converts the destination address into an actual address (S408), and transmits (forwards) the packet to the routing session identified in S406 (S409).

Figure 16:
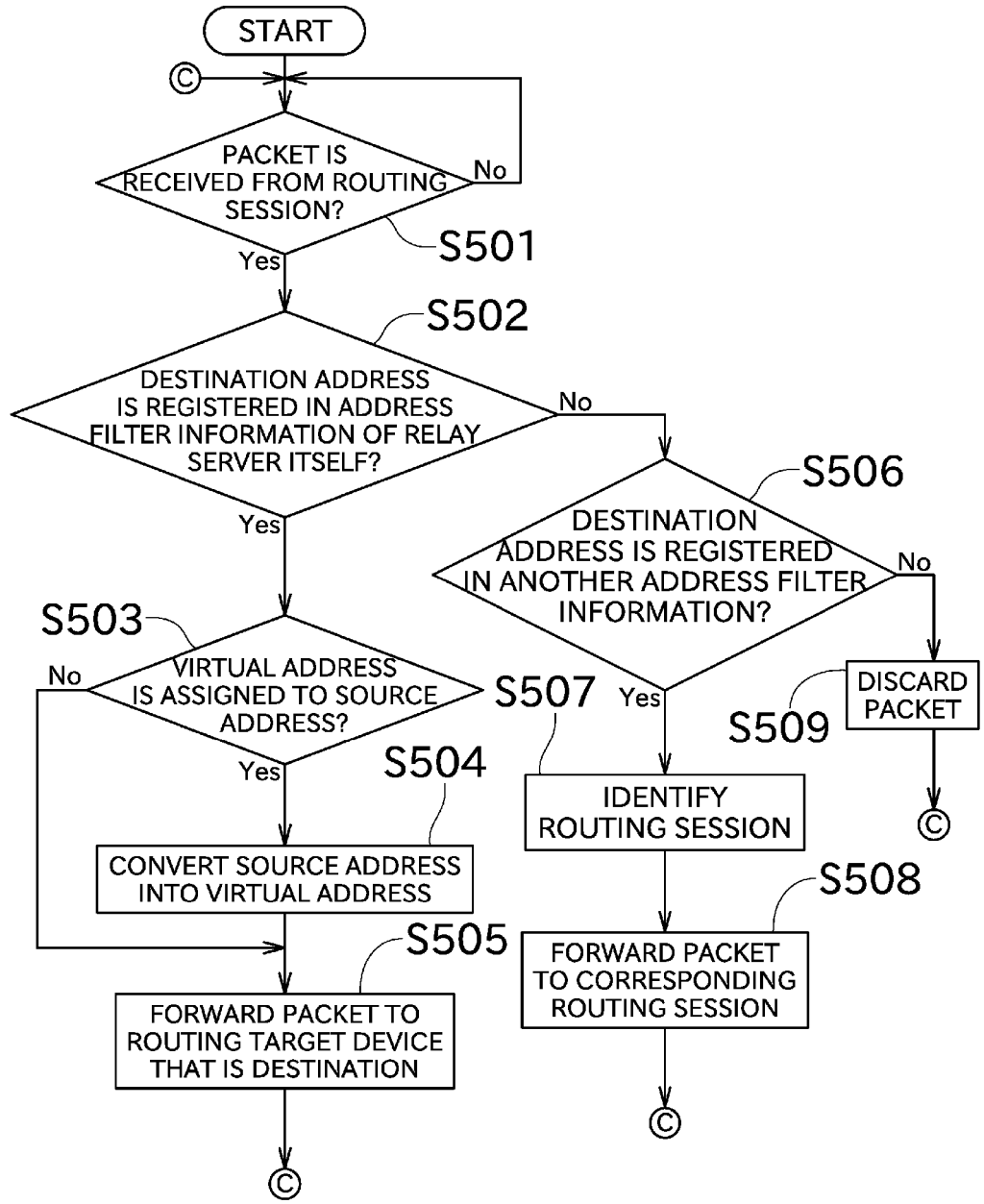
FIG. 16 is a flowchart showing a routing control that the relay server performs upon reception of a packet from a routing session.

Next, a control performed when the relay server 3 receives a packet from a routing session will be described with reference to FIG. 16. FIG. 16 is a flowchart showing a flow of this control.

The relay server 3 waits until the packet is received from the routing session (S501). When the packet is received, the relay server 3 compares the destination address of this packet with the address filter information (see FIG. 9B), and determines whether or not the destination address of the packet is registered in association with the address filter information of the relay server 3 itself (S502).

In a case where the destination address of the packet is registered in association with the address filter information of the relay server 3 itself, the relay server 3 refers to the virtual address assignment information storage unit 57, to determine whether or not a virtual address has been assigned to a source address (S503). In a case where a virtual address has been assigned to the source address, the relay server 3 converts the source address into the virtual address (S504), and forwards the packet to the apparatus (terminals 31, 32, and 33) indicated by the destination address (S505). In a case where no virtual address has been assigned to the source address, the relay server 3 does not convert the address, and forwards the packet to the apparatus indicated by the destination (S505).

In a case where the destination address is not registered in association with the address filter information of the relay server 3 itself, the relay server 3 determines whether or not this destination address is registered in association with the address filter information of another routing apparatus (S506). In a case where this destination address is registered in association with the address filter information of another routing apparatus, the relay server 3 identifies the corresponding routing session (S507), and transmits (forwards) the packet to this routing session (S508).

In a case where this destination address is not registered in the address filter information of another routing apparatus, either, the relay server 3 discards the packet (S509).

The above-described control enables the relay server 3 to perform communication using the virtual address.

Next, a flow of the exchange of a packet between the operation PC 11 and the target terminal 31 via the relay servers 1 and 3, which perform the above-described control, will be briefly described with reference to FIGS. 17A and 17B.

FIG. 17A shows a case where a packet is transmitted from the target terminal 31 to the operation PC 11. In this case, the relay server 1 performs the control shown in FIG. 16, in order to receive the packet from the routing session. On the other hand, the relay server 3 performs the control shown in FIG. 15, in order to receive the packet from the LAN 30.

The target terminal 31 transmits a packet to the virtual address of the operation PC 11 as the destination address, as described above. The relay server 3, which receives the packet, recognizes that the relay server 1 is described as a routing apparatus corresponding to the destination address of the packet based on the address filter information (See FIG. 9B), and identifies the routing session (S406). Then, the relay server 3 recognizes that the destination address is a virtual address, and converts the destination address into the actual address (S408). Then, the relay server 3 transmits the packet to the relay server 1 via the routing session (S409).

The relay server 1, which receives the packet, recognizes that itself (relay server 1) is described as a routing apparatus corresponding to the destination address of the packet based on the address filter information (see FIG. 8B). Then, the relay server 1 recognizes that the source address is associated with a virtual address, and converts the source address into the virtual address (S504). Then, the relay server 1 transmits the packet to the destination operation PC 11 (S505).

FIG. 17B shows a case where a packet is transmitted from the operation PC 11 to the target terminal 31. In this case, the relay server 1 performs the control shown in FIG. 15, in order to receive the packet from the LAN 10. On the other hand, the relay server 3 performs the control shown in FIG. 16, in order to receive the packet from the routing session.

The operation PC 11 transmits a packet to the virtual address of the target terminal 31 as the destination. The relay server 1, which receives the packet, performs the processing to identify the routing session (S406), the processing to convert the destination address into the actual address (S408), and the processing to transmit the packet to the relay server 3 (S409), similarly to the relay server 3 described above.

The relay server 3, which receives the packet, performs the processing to convert the source address into the virtual address (S504) and the processing to transmit the packet to the destination target terminal 31 (S505), similarly to the relay server 1 described above.

In the above-described manner, even when the first routing target address and the second routing target address overlap, the communication is performed by using the assigned virtual address.

As illustrated above, the relay server 3 of this preferred embodiment preferably includes the address filter information storage unit 55, the virtual address assignment information storage unit 57, the VPN group information storage unit 54, and the control unit 60. The address filter information storage unit 55 stores the first routing target address and the second routing target address. The virtual address assignment information storage unit 57 stores the second routing target address in association with the virtual address assigned to this second routing target address. The VPN group information storage unit 54 stores the VPN group information that is information concerning the relay server selected as a routing point. The control unit 60 is programmed and configured to perform the control to select a VPN group in response to, for example, a user's instruction. The control unit 60 exchanges the address filter information with the relay server 1 belonging to the selected VPN group, and establishes a routing session with the relay server 1. The control unit 60 is programmed and configured to the determination process to determine whether or not there is an overlap between the routing target addresses. In a case where the determination process results in a determination that there is an overlap, the control unit 60 assigns a virtual address to the second routing target address, and stores the relationship of assignment into the virtual address assignment information storage unit 57. When a packet whose destination is the virtual address is received from the first routing target device, the control unit 60 converts the destination address of the packet into the second routing target address and forwards the packet to the corresponding routing session. When a packet whose destination is the first routing target address is received from the routing session, the control unit 60 converts the source address of the packet into a virtual address if the virtual address is assigned, and forwards the packet to the destination.

Accordingly, even when the first routing target address and the second routing target address overlap, the relay communication via the routing session is started without requiring the user to change the setting by hand. This saves the labor of changing the routing target address and the labor of re-performing the process for starting the relay communication. Therefore, the relay communication is started smoothly. Additionally, whether or not the use of the virtual address is necessary is determined with respect to the selected VPN group. This enables the virtual address to be used only when needed. Particularly, the detection of overlapping addresses is performed after the VPN group is started and the address filter information is exchanged. Therefore, the virtual address is used based on the latest address of the relay server belonging to the VPN group.

The relay server 3 of this preferred embodiment further includes the virtual address registration information storage unit 56 that stores the virtual address that is registered in advance. In a case where the determination process results in a determination that there is an overlap, the control unit 60 assigns the virtual address stored in the virtual address registration information storage unit 56 to the second routing target address.

Accordingly, the range of addresses usable as the virtual address is defined in advance. Thus, addresses available in a case of, for example, providing an additional LAN are ensured. Moreover, it is not necessary to generate a virtual address each time the relay communication is started. This significantly reduces the processing performed by the control unit 60.

Even though routing target addresses are not completely identical, the relay server 3 of this preferred embodiment determines that there is an overlap when the routing target addresses have the same network address.

In a case where, for example, routing target addresses have the same network address and different host addresses, a situation can occur where two addresses whose host addresses are also identical are used as a result of, for example, an additional routing target device being provided. In this respect, the above-described configuration determines that there is an overlap when the network addresses are identical. Accordingly, an overlap between addresses is sensed before it occurs, and a virtual address is assigned in advance.

In a case where the selected VPN group includes the relay servers 1, 2, and 3, the relay server 3 of this preferred embodiment determines whether or not there is an overlap between the three routing target addresses.

Accordingly, even when a VPN group including three or more relay servers is selected, an overlap between routing target addresses is detected and a virtual address is assigned.

Although preferred embodiments of the present invention have been described above, the above-described configurations can be modified, for example, as follows.

In the above-described preferred embodiments, the relay server 3 preferably is configured to assign the virtual address registered in the virtual address registration information storage unit 56. Instead, it may be also acceptable that the relay server 3 does not includes the virtual address registration information storage unit 56 and the relay server 3 is configured to generate a virtual address upon detection of an overlap. At this time, the relay server 3 refers to the content stored in the address filter information storage unit 55, and sets the virtual address to be an address not used for performing the VPN. As a result, a virtual address that avoids an overlap with any used addresses is reliably generated without fail.

Any method may be used to determine whether or not there is an overlap between routing target addresses. In an exemplary configuration, it may be determined that there is an overlap only when both network addresses and host addresses are identical.

In the above-described configuration, the address filter information preferably is exchanged simultaneously or substantially simultaneously with establishment of the routing session. Alternatively, it may be also acceptable that the address filter information is transmitted together with the VPN-group start command (S305) and the address filter information is received together with a response (S306).

In the above-described configurations, an individual apparatus such as the operation PC 11 or the like preferably defines and serves as the routing target device. In an alternative configuration, for example, the entire LAN 10 (192.168.0.0/24) may be set as the routing target device of the relay server 1. In such a case, a virtual address whose range is designated, such as (160.90.1.0/24), is assigned to this routing target device.

The assignment of the virtual address may be performed at any timing. In an exemplary configuration, the address filter information may be transmitted simultaneously with the transmission of the start command. In such a case, the detection of an overlap between routing target addresses and the assignment of a virtual address can be performed at an earlier timing.

In the above-described configurations, only the relay server preferably defines and functions as a routing point. A configuration may be also acceptable in which the client terminal functions as a routing point. Although the above description illustrates a case of a certain number of routing points within the VPN group, this is not limiting. Three or more routing points are acceptable. It is also acceptable that one routing apparatus belongs to a plurality of VPN groups.

A format in which the above-described relay group information, relay server information, client terminal information, VPN group information, address filter information, and the like, are stored is not limited to XML format. These kinds of information can be stored in any appropriate format.

Instead of the configurations of the above-described preferred embodiments, a configuration is also acceptable in which an external server used for communication between relay servers is placed on the Internet and caused to exert a function as an SIP (Session Initiation Protocol) server, thus performing communication.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A relay server comprising:
an address filter information storage unit configured to store a first routing target address and a second routing target address, the first routing target address being an address of a first routing target device that is located in a first LAN and to which the relay server is able to forward a packet, the second routing target address being an address of a second routing target device that is located in a second LAN and to which a second relay server is able to forward a packet;
a virtual address assignment information storage unit configured to store a second routing target address in association with a virtual address assigned to the second routing target address;
a VPN group information storage unit configured to store VPN group information that is information concerning a relay server that has been selected as a routing point; and
a control unit programmed and configured to perform control to:
select a VPN group;
transmit the first routing target address to the second relay server belonging to the selected VPN group, receive the second routing target address from the second relay server, and establish a routing session with the second relay server;
perform a determination process to determine whether or not there is an overlap between the first routing target address and the second routing target address;
in a case where the determination process results in a determination that there is an overlap, assign the virtual address to the second routing target address and store a relationship of assignment in the virtual address assignment information storage unit;
when a packet whose destination is the virtual address is received from the first routing target device, refer to the virtual address assignment information storage unit, convert a destination address of the packet into the second routing target address associated with the virtual address, and forward the packet to the routing session; and
when a packet whose destination is the first routing target address is received from the routing session, refer to the virtual address assignment information storage unit, convert a source address of the packet into the virtual address assigned to the second routing target address if the virtual address is assigned, and forward the packet to the first routing target device that is the destination.

2. The relay server according to claim 1, wherein in a case where the determination process results in a determination that there is an overlap, the control unit is programmed and configured to generate the virtual address in consideration of a content stored in the address filter information storage unit, and to assign the generated virtual address to the second routing target address.

3. The relay server according to claim 1, further comprising a virtual address registration information storage unit configured to store the virtual address that is registered in advance; wherein
in a case where the determination process results in a determination that there is an overlap, the control unit is programmed and configured to assign the virtual address stored in the virtual address registration information storage unit to the second routing target address.

4. The relay server according to claim 1, wherein even in a case where routing target addresses are not completely identical, the control unit is programmed and configured to determine that there is an overlap when the routing target addresses have a same network address.

5. The relay server according to claim 1, wherein
the control unit is programmed and configured to receive the second routing target address from the second relay server belonging to a selected VPN group, and receive a third routing target address from a third relay server belonging to the VPN group; and
the control unit is programmed and configured to perform the determination process to determine whether or not there is an overlap among the first routing target address, the second routing target address, and the third routing target address.

6. A relay communication system comprising:
a first relay server; and
a second relay server; wherein
the first relay server located in a first LAN includes:
an address filter information storage unit configured to store a first routing target address and a second routing target address, the first routing target address being an address of a first routing target device to which the first relay server is able to forward a packet, the second routing target address being an address of a second routing target device to which the second relay server located in a second LAN is able to forward a packet;
a virtual address assignment information storage unit configured to store a second routing target address in association with a virtual address assigned to the second routing target address;
a VPN group information storage unit configured to store VPN group information that is information concerning a relay server that has been selected as a routing point; and
a control unit programmed and configured to perform control to:
select a VPN group;
transmit the first routing target address to the second relay server belonging to the selected VPN group, receive the second routing target address from the second relay server, and establish a routing session with the second relay server;
perform a determination process to determine whether or not there is an overlap between the first routing target address and the second routing target address;
in a case where the determination process results in a determination that there is an overlap, assign the virtual address to the second routing target address and store a relationship of assignment in the virtual address assignment information storage unit;
when a packet whose destination is the virtual address is received from the first routing target device, refer to the virtual address assignment information storage unit, convert a destination address of the packet into the second routing target address associated with the virtual address, and forward the packet to the routing session; and when a packet whose destination is the first routing target address is received from the routing session, refer to the virtual address assignment information storage unit, convert a source address of the packet into the virtual address assigned to the second routing target address if the virtual address is assigned, and forward the packet to the first routing target device that is the destination.

* * * * *